No. 865,288. PATENTED SEPT. 3, 1907.
E. K. BAKER & C. G. HAWLEY.
TREAD FOR PNEUMATIC TIRES.
APPLICATION FILED MAY 16, 1907.

2 SHEETS—SHEET 1.

Witnesses:
A. W. Nelson
H. Simston

Inventors:
Erle K. Baker and
Charles G. Hawley

No. 865,288. PATENTED SEPT. 3, 1907.
E. K. BAKER & C. G. HAWLEY.
TREAD FOR PNEUMATIC TIRES.
APPLICATION FILED MAY 16, 1907.

2 SHEETS—SHEET 2.

Witnesses:
A. W. Nelson
H. J. Austin

Inventors:
Erle K. Baker
and Charles G. Hawley
Atty.

UNITED STATES PATENT OFFICE.

ERLE K. BAKER AND CHARLES GILBERT HAWLEY, OF CHICAGO, ILLINOIS.

TREAD FOR PNEUMATIC TIRES.

No. 865,288.　　　　　Specification of Letters Patent.　　　　　Patented Sept. 3, 1907.

Application filed May 16, 1907. Serial No. 374,059.

*To all whom it may concern:*

Be it known that we, ERLE K. BAKER and CHARLES GILBERT HAWLEY, citizens of the United States, and residents of Chicago, Cook county, Illinois, have invented certain new and useful Improvements in Treads for Pneumatic Tires, of which the following is a full, clear, and exact description, such as will enable others skilled in the art to which it appertains to make and use the same.

Our invention relates to pneumatic tire casings or shoes and has special reference to improvements in the tread portions of such articles.

The object of our invention is to provide a so-called non-skid tire of improved construction.

With this object in view, our invention consists in a pneumatic tire casing or shoe having an envelop or tread portion which contains a great number of staple-like metallic parts embedded therein, the ends of said parts projecting outwardly through, or substantially through, the surface of said tread portion.

Figure 1:
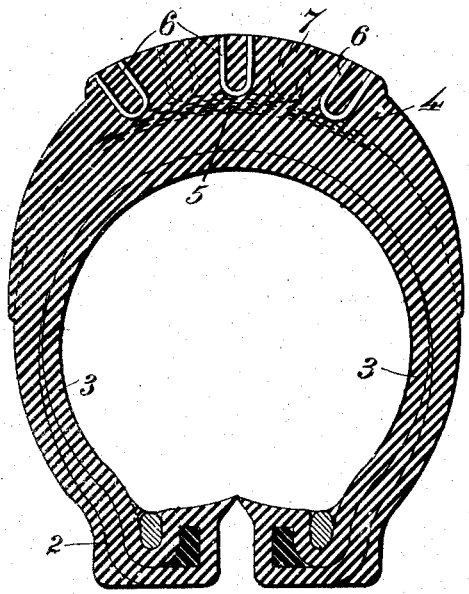
Figure 2:
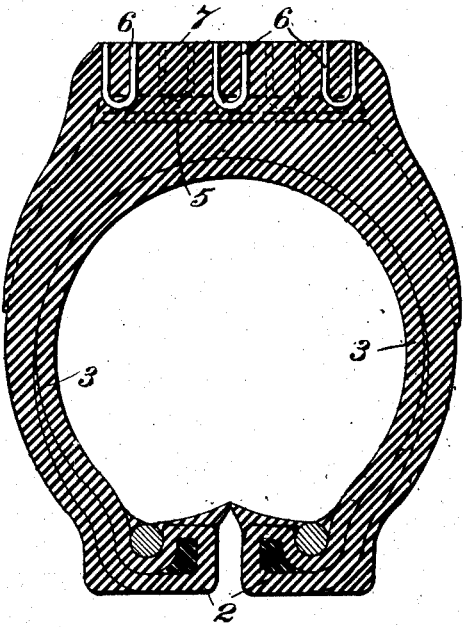
Figure 4:
Figure 5:
Figure 3:
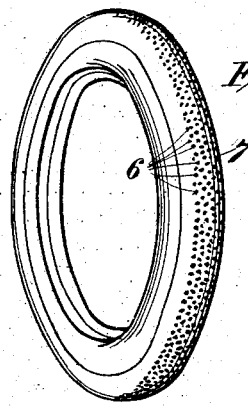
Figure 3:
Figure 6:
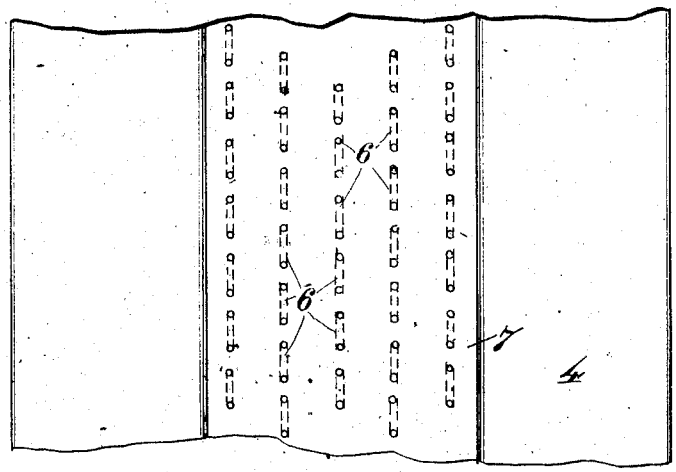
Figure 7:
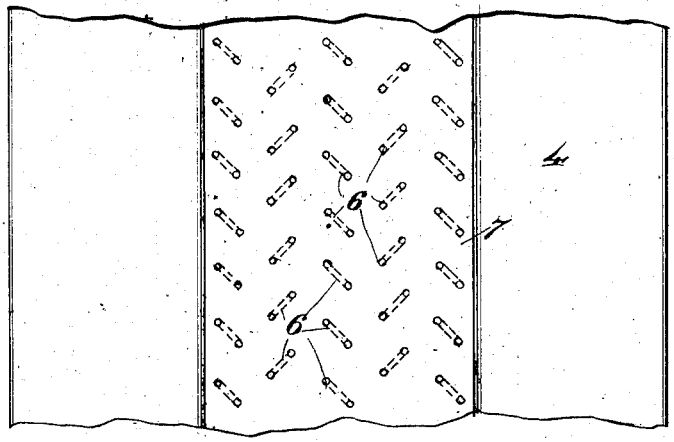
Figure 8:
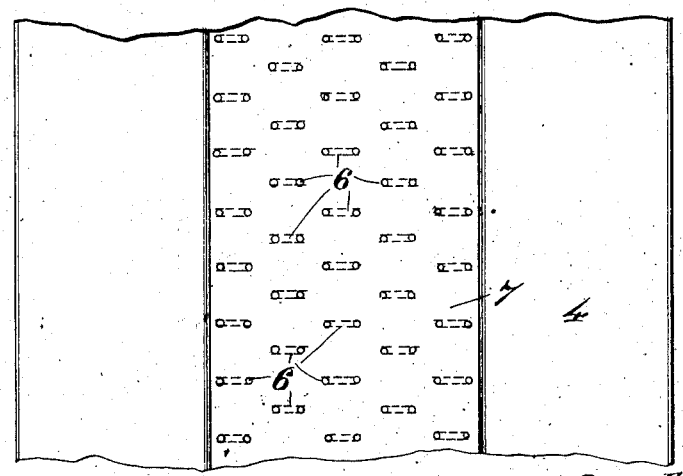

Our invention will be more readily understood by reference to the accompanying drawings, forming a part of this specification and in which;

Figure 1 is a sectional view of a tire casing or shoe embodying our invention; Fig. 2 is a similar sectional view of a casing of modified form in cross section; Fig. 3 is a perspective view of our novel tire casing; Figs. 4 and 5 are sectional views of tread portions of different forms as they appear before being applied to the tire casing; and Figs. 6, 7 and 8 are face views of portions of treads, illustrating several ways of arranging the metallic parts therein.

As indicated in the drawings, a tire embodying our invention may present any one of the several forms in cross section. In other words, our invention is not dependent upon or limited to the precise forms or constructions herein shown.

Referring to the drawings, 2 represents the base portion of the tire, 3—3 the sides thereof, and 4, the thickened tread portion, in which so-called interference strips 5 are embedded. The outer portion of the tread contains a large number of metallic, staple-like or U-shaped parts 6, the closed, rounded ends of which are preferably positioned to substantially rest upon the interference strips, 5. These parts are usually formed of steel wire and their ends pierce the surface 7 of the casing; therefore, they contact the ground or road surface and, firmly engaging therewith, aid the rubber surface in preventing slippage of the wheel. In manufacturing this tire, we prefer to form the tread or at least a portion thereof separately from the remainder of the tire casing, and this may be done conveniently by simply driving the U-shaped parts or staples through the inner side of the tread portion, 4, as shown in Figs. 4 and 5. In some cases we provide the inner surface of the tread portion with a lining or outer interference strip of cloth, 8, through which the staples are driven.

It will be obvious that the staples may be arranged in various forms. Several of these forms or arrangements are shown in Figs. 6, 7 and 8, preference being given to the arrangement shown in Fig. 7. When first made, the ends of the U-shaped parts do not show through the skin of the tire, but after a little use the surface of the tire will present substantially the appearance represented in Fig. 3.

A particular advantage of our invention resides in the fact that a tire having a tread portion of our invention may be wrapped and vulcanized after the manner of other so-called wrapped tires and need not be formed in a complete or closed mold.

Having thus described our invention, we claim as new and desire to secure by Letters Patent;

1. A resilient tire for vehicles, having a tread portion containing an interference strip of fabric, vulcanized therein, and also containing a large number of staple-like metallic parts having closed, rounded ends in substantial contact with said interference strip and presenting their ends at the surface of said tread portion, substantially as and for the purpose specified.

2. A pneumatic tire having a tread portion, containing an interference strip, vulcanized therein, and also containing a large number of diagonally positioned staple-like metallic parts having closed, rounded ends in substantial contact with said interference strip and presenting their ends at the surface of said tread portion, substantially as and for the purpose specified.

3. A pneumatic tire having a tread portion containing two interference strips of fabric, vulcanized therein, and also containing a large number of U-shaped metallic parts, extending through the outermost interference strip, having closed, rounded ends in substantial contact with the inner interference strip and presenting their ends at the surface of said tread portion, substantially as and for the purpose specified.

4. A pneumatic tire having a vulcanized tread portion, containing a large number of U-shaped metallic parts having closed, rounded ends and straight sides or legs, said metallic parts being embedded in said tread portion and presenting their open ends at the surface thereof, substantially as and for the purpose specified.

In testimony whereof, we have hereunto set our hands this 4th day of May, 1907, in the presence of two subscribing witnesses.

ERLE K. BAKER.
　　　　　　　　　CHARLES GILBERT HAWLEY.

Witnesses:
　M. SIMON,
　A. W. NELSON.